United States Patent
Xiao et al.

(10) Patent No.: US 11,126,458 B2
(45) Date of Patent: Sep. 21, 2021

(54) METHOD, APPARATUS, AND ELECTRONIC DEVICE FOR RESOURCE ALLOCATION BASED ON BLOCKCHAIN

(71) Applicant: Advanced New Technologies Co., Ltd., Grand Cayman (KY)

(72) Inventors: Hansong Xiao, Hangzhou (CN); Wenhu Kan, Hangzhou (CN); Ping Zhang, Hangzhou (CN); Jinming Duan, Hangzhou (CN); Zhen Sun, Hangzhou (CN); Liangrong Lin, Hangzhou (CN); Qin Liu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 17/160,942

(22) Filed: Jan. 28, 2021

(65) Prior Publication Data
US 2021/0150558 A1    May 20, 2021

Related U.S. Application Data

(63) Continuation of application No. PCT/CN2019/115402, filed on Nov. 4, 2019.

(30) Foreign Application Priority Data

Dec. 25, 2018 (CN) .......................... 201811595314.5

(51) Int. Cl.
  *G06F 9/00* (2006.01)
  *G06F 9/46* (2006.01)
  (Continued)

(52) U.S. Cl.
  CPC .......... *G06F 9/466* (2013.01); *G06F 16/2379* (2019.01); *G06F 16/2455* (2019.01);
  (Continued)

(58) Field of Classification Search
  None
  See application file for complete search history.

(56) References Cited

U.S. PATENT DOCUMENTS 7,626,972 B2 * 12/2009 Garani ................... H04L 29/06
                                                         370/329
8,041,335 B2 * 10/2011 Khetawat .............. H04W 76/12
                                                         455/404.2

(Continued)

FOREIGN PATENT DOCUMENTS

CN    106952124 A    7/2017
CN    107451874 A    12/2017
(Continued)

OTHER PUBLICATIONS

Whitaker, Amy. "Art and blockchain: A primer, history, and taxonomy of blockchain use cases in the arts." Artivate 8.2 (2019): 21-46 . (Year: 2019).*

(Continued)

*Primary Examiner* — Gurkanwaljit Singh
(74) *Attorney, Agent, or Firm* — Seed IP Law Group LLP

(57) ABSTRACT

Implementations of the present specification provide methods, apparatuses, and electronic devices for resource allocation based on blockchain. The blockchain stores a mapping relationship between a digital digest of an invoice and a resource allocation state corresponding to the invoice. The method includes: receiving a target transaction submitted by a client to participate in resource allocation based on a target invoice; in response to the target transaction, calculating a digital digest of the target invoice, and querying a resource (Continued)

allocation state stored in the blockchain and corresponding to the digital digest; and if the detected resource allocation state is an unallocated state, invoking resource allocation logic declared in a smart contract published in the blockchain, to allocate resources to the client from a predetermined resource pool based on a predetermined allocation rule, and returning a resource allocation result to the client.

20 Claims, 5 Drawing Sheets

(51) Int. Cl.
    G06F 16/23      (2019.01)
    G06F 16/2455    (2019.01)
    G06Q 10/06      (2012.01)
    G06Q 10/10      (2012.01)
    G06Q 30/02      (2012.01)
    G06Q 30/04      (2012.01)
    H04L 9/06       (2006.01)
    H04W 4/021      (2018.01)
    H04L 29/06      (2006.01)
    H04L 9/32       (2006.01)
    G06Q 40/00      (2012.01)

(52) U.S. Cl.
    CPC ....... *G06Q 10/06315* (2013.01); *G06Q 10/10* (2013.01); *G06Q 30/0212* (2013.01); *G06Q 30/04* (2013.01); *H04L 9/0637* (2013.01); *H04L 9/0643* (2013.01); *H04L 9/3236* (2013.01); *H04L 9/3239* (2013.01); *H04L 29/06* (2013.01); *H04W 4/021* (2013.01); *G06Q 40/10* (2013.01); *H04L 2209/38* (2013.01)

(56) References Cited

U.S. PATENT DOCUMENTS

| | | | | |
|---|---|---|---|---|
| 10,158,703 | B2* | 12/2018 | Kurian | G06Q 10/06312 |
| 10,348,488 | B1* | 7/2019 | Paczkowski | H04L 9/3239 |
| 10,440,101 | B2* | 10/2019 | Kurian | G06F 21/64 |
| 10,735,183 | B1* | 8/2020 | Mehta | H04L 63/045 |
| 10,785,168 | B2* | 9/2020 | Zou | H04L 47/788 |
| 10,884,810 | B1* | 1/2021 | Verma | H04L 67/02 |
| 2017/0140408 | A1 | 5/2017 | Wuehler | |
| 2017/0244720 | A1* | 8/2017 | Kurian | G06Q 40/06 |
| 2017/0359408 | A1* | 12/2017 | Kurian | G06Q 10/06 |
| 2019/0188787 | A1* | 6/2019 | Besanson Tuma | H04L 9/0637 |
| 2019/0244287 | A1* | 8/2019 | Prasad Datta | G06Q 40/025 |
| 2019/0379664 | A1* | 12/2019 | Suthar | H04L 63/0892 |
| 2019/0379727 | A1* | 12/2019 | Kurian | G06F 21/64 |
| 2019/0385120 | A1* | 12/2019 | Yund | H04L 9/0637 |
| 2020/0044857 | A1* | 2/2020 | Snow | H04L 9/0643 |
| 2020/0177519 | A1* | 6/2020 | Zou | H04L 63/123 |
| 2020/0250676 | A1* | 8/2020 | Sierra | H04L 9/302 |
| 2020/0252224 | A1* | 8/2020 | Tomaselli | H04L 9/3268 |
| 2020/0394708 | A1* | 12/2020 | Celia | G06Q 30/0206 |
| 2020/0394709 | A1* | 12/2020 | Celia | G06N 5/04 |
| 2020/0401573 | A1* | 12/2020 | Coleman | G06F 16/2315 |

FOREIGN PATENT DOCUMENTS

| | | |
|---|---|---|
| CN | 107528877 A | 12/2017 |
| CN | 108305106 A | 7/2018 |
| CN | 108520415 A | 9/2018 |
| CN | 108648066 A | 10/2018 |
| CN | 108734584 A | 11/2018 |
| CN | 110020901 A | 7/2019 |
| TW | 201837798 A | 10/2018 |

OTHER PUBLICATIONS

"Blockchain Enabled Applications: Understand the Blockchain Ecosystem and How to Make it Work for You." by Vikram Dhillon, David Metcalf, Max Hooper; Publisher: Apress; Release Date: Nov. 2017; ISBN: 9781484230817 (Year: 2017).*
Gupta, Sahil, Patrick Lauppe, and Shreyas Ravishankar. "A Blockchain-Backed Central Bank Cryptocurrency." Retrieved 10 (2017): 2017. (Year: 2017).*
Gans, Joshua S. "Some Simple Economics of the Blockchain." (2016). (Year: 2016).*
Bonneau, Joseph, et al. "Sok: Research perspectives and challenges for bitcoin and cryptocurrencies." 2015 IEEE symposium on security and privacy. IEEE, 2015. (Year: 2015).*
Anderson, Ross. "How to cheat at the lottery (or, massively parallel requirements engineering)." Proceedings 15th Annual Computer Security Applications Conference (ACSAC'99). IEEE, 1999. (Year: 1999).*
International Search Report and Written Opinion, dated Feb. 6, 2020, for International Application No. PCT/CN2019/115402, 6 pages.

* cited by examiner

METHOD, APPARATUS, AND ELECTRONIC DEVICE FOR RESOURCE ALLOCATION BASED ON BLOCKCHAIN

BACKGROUND

Technical Field

Implementations of the present specification relate to the field of blockchain technologies, and in particular, to methods, apparatuses, and electronic devices for resource allocation based on blockchain.

Description of the Related Art

Blockchain technology, also known as distributed ledger technology, is an emerging technology in which several computing devices participate in "bookkeeping" and jointly maintain a complete distributed database. Because blockchain technology is characterized by being decentralized, open and transparent, enabling each computing device to participate in database recording, and enabling data synchronization to be performed quickly between the computing devices, blockchain technology is widely used in many fields.

BRIEF SUMMARY

Implementations of the present specification provide methods, apparatuses, and electronic devices for resource allocation based on blockchain.

According to a first aspect of the implementations of the present specification, a method for resource allocation based on a blockchain, where the blockchain stores a mapping relationship between a digital digest of an invoice and a resource allocation state corresponding to the invoice is provided, the method including: receiving a target transaction submitted by a client to participate in resource allocation based on a target invoice; in response to the target transaction, calculating a digital digest of the target invoice, and querying a resource allocation state stored in the blockchain and corresponding to the digital digest; and if the detected resource allocation state is an unallocated state, invoking resource allocation logic declared in a smart contract published in the blockchain, to allocate resources to the client from a predetermined resource pool based on a predetermined allocation rule, and returning a resource allocation result to the client.

Optionally, the method further includes: receiving an invoice creation request submitted by the client, the invoice creation request including invoice creation information input by a user; in response to the invoice creation request, invoking invoice creation logic declared in the smart contract published in the blockchain to create an invoice based on the invoice creation information; and, calculating a digital digest of the invoice, and storing a mapping relationship between the digital digest and a resource allocation state of the invoice in the blockchain, an initial resource allocation state of the invoice being an unallocated state.

Optionally, the calculating a digital digest of the target invoice, and querying a resource allocation state stored in the blockchain and corresponding to the digital digest includes: invoking state query logic declared in the smart contract published in the blockchain to calculate a digital digest of the target invoice, and querying a resource allocation state stored in the blockchain and corresponding to the digital digest.

Optionally, the method further includes: after target resources are allocated to the client from the predetermined resource pool, further invoking resource allocation state update logic declared in the smart contract published in the blockchain, to change the resource allocation state of the target invoice from the unallocated state to an allocated state.

Optionally, the blockchain further stores a corresponding relationship between each category of resources in the resource pool and the number of resources; the method further including: after the target resources are allocated to the client from the predetermined resource pool based on the predetermined allocation rule, updating a number of resources stored in the blockchain and corresponding to the target resource.

Optionally, the digital digest of the invoice includes: a hash value obtained through hash calculation based on invoice content of the invoice or unique information in the invoice content.

Optionally, the target transaction includes the invoice content of the target invoice or the unique information in the invoice content; and the calculating the digital digest of the target invoice includes: obtaining the invoice content of the target invoice in the target transaction or the unique information in the invoice content; and performing hash calculation based on the obtained invoice content of the target invoice or the obtained unique information in the invoice content to obtain the hash value.

Optionally, the blockchain is a consortium blockchain.

Optionally, the resource pool includes a prize pool; the resources include virtual prizes; the resource allocation includes extracting virtual prizes for the client from the prize pool; and the resource allocation state includes a lottery state.

According to a second aspect of the implementations of the present specification, an apparatus for resource allocation based on a blockchain, where the blockchain stores a mapping relationship between a digital digest of an invoice and a resource allocation state corresponding to the invoice is provided, the apparatus including: a receiving unit, configured to receive a target transaction submitted by a client to participate in resource allocation based on a target invoice; a query unit, configured to: in response to the target transaction, calculate a digital digest of the target invoice, and query a resource allocation state stored in the blockchain and corresponding to the digital digest; and an allocation unit, configured to: if the detected resource allocation state is an unallocated state, invoke resource allocation logic declared in a smart contract published in the blockchain, to allocate resources to the client from a predetermined resource pool based on a predetermined allocation rule, and return a resource allocation result to the client.

Optionally, the apparatus further includes: an invoice creation request receiving unit, configured to receive an invoice creation request submitted by the client, the invoice creation request including invoice creation information input by a user; and an invoice creation response unit, configured to: in response to the invoice creation request, invoke invoice creation logic declared in the smart contract published in the blockchain to create an invoice based on the invoice creation information; calculate digital digest of the invoice, and store a mapping relationship between the digital digest and a resource allocation state of the invoice in the blockchain, an initial resource allocation state of the invoice being an unallocated state.

Optionally, the query unit is specifically configured to: in response to the target transaction, invoke state query logic declared in the smart contract published in the blockchain to calculate a digital digest of the target invoice, and query a resource allocation state stored in the blockchain and corresponding to the digital digest.

Optionally, the apparatus further includes: a state update subunit, configured to: after target resources are allocated to the client from the predetermined resource pool, further invoke resource allocation state update logic declared in the smart contract published in the blockchain, to change the resource allocation state of the target invoice from the unallocated state to an allocated state.

Optionally, the blockchain further stores a corresponding relationship between each category of resources in the resource pool and the number of resources; the apparatus further including: a number update subunit, configured to: after the target resources are allocated to the client from the predetermined resource pool based on the predetermined allocation rule, update a number of resources stored in the blockchain and corresponding to the target resource.

Optionally, the digital digest of the invoice includes: a hash value obtained through hash calculation based on invoice content of the invoice or unique information in the invoice content.

Optionally, the target transaction includes the invoice content of the target invoice or the unique information in the invoice content; and the calculating the digital digest of the target invoice includes: obtaining the invoice content of the target invoice in the target transaction or the unique information in the invoice content; and performing hash calculation based on the obtained invoice content of the target invoice or the obtained unique information in the invoice content to obtain the hash value.

Optionally, the blockchain is a consortium blockchain.

Optionally, the resource pool includes a prize pool; the resources include virtual prizes; the resource allocation includes extracting virtual prizes for the client from the prize pool; and the resource allocation state includes a lottery state.

According to a third aspect of the implementations of the present application, an electronic device is provided, including: a processor; and a memory configured to store processor-executable instructions; where the processor is configured to perform any one of the above methods for resource allocation based on a blockchain.

Some implementations of the present specification provide a resource allocation solution based on a blockchain, which enables digital digest and a resource allocation state of an invoice to be stored in the blockchain in advance. Data stored in the blockchain cannot be tampered with and the digital digest is unique (that is, one digital digest corresponds to one piece of original data); and therefore, whether a target invoice is true can be determined based on the digital digest stored in the blockchain. Specifically, a user only needs to upload the target invoice by using the client, and if it can be detected that the resource allocation state corresponding to the digital digest of the target invoice is stored in the blockchain, it can be determined that the target invoice is true. When the resource allocation state is an unallocated state, resource allocation logic declared in a smart contract published in the blockchain can be invoked to allocate resources to the client from a predetermined resource pool based on a predetermined allocation rule.

DETAILED DESCRIPTION

Figure 1:
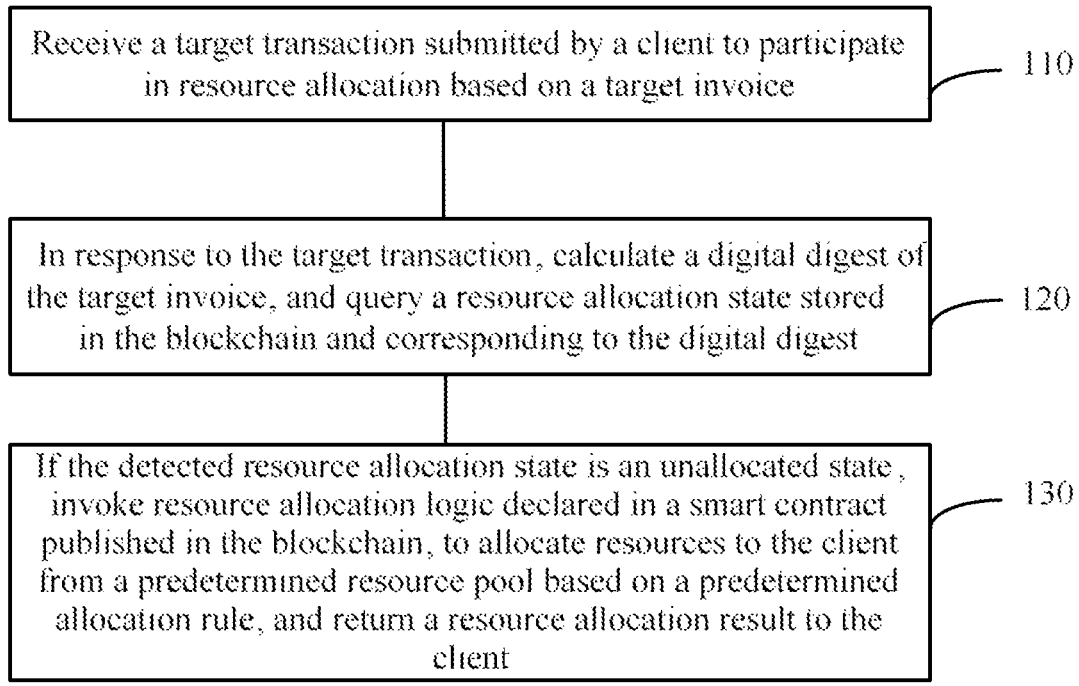
FIG. 1 is a flowchart illustrating a method for resource allocation based on a blockchain according to some implementations of the present specification.

Example implementations are described in detail herein, and examples thereof are shown in the accompanying drawings. When the following description refers to the accompanying drawings, unless otherwise indicated, the same numbers in different accompanying drawings refer to the same or similar elements. The following example implementations do not represent all implementations consistent with the present specification. In contrast, they are merely examples of apparatuses and methods consistent with some aspects of the present specification as described in detail in the appended claims.

Terms used in the present specification are for the purpose of describing specific implementations only and are not intended to limit the present specification. As used in the present specification and the appended claims, the singular forms "a (an)", "the", and "this" are also intended to include the plural forms, unless the context clearly indicates other meaning. It should also be understood that the term "and/or" as used herein refers to and includes any or all possible combinations of one or more associated listed items.

It should be understood that although the terms such as "first", "second", and "third" can be used to describe various types of information in the present specification, the information should not be limited to these terms. These terms are only used to differentiate information of a same type. For example, without departing from the scope of the present specification, the first information can also be called second information, and similarly, the second information can also be called first information. Depending on the context, the word "if" as used herein can be explained as "when" or "in response to determining".

An invoice can refer to a business voucher issued and collected by all units or individuals in purchasing and selling products, providing or receiving services and engaging in other business activities. Invoices are usually the original basis of accounting, and are also an important basis for law enforcement inspection by audit institutions and tax authorities. For a company, invoices are mainly the basis for the company to perform accounting, and are also the expense vouchers for paying taxes. For employees, invoices can be mainly used for reimbursement.

A series of operations can be performed on invoices, such as reimbursement, tax offset, tax refund, and lottery. Taking the lottery service as an example, the tax authorities provide an incentive mechanism of invoice lottery to encourage users to request invoices. Specifically, after requesting an invoice, a user can go to the tax bureau to fill in invoice data and draw a lottery. However, users in general do not know this mechanism, and even if they know the mechanism, they will not go to the tax bureau for drawing a lottery due to the lack of professional knowledge, which affects the enthusiasm of users to request invoices, and then makes it possible for merchants to evade taxes. In view of this, a solution that enables users to query invoices and draw a lottery at any time is needed.

The present specification provides a resource allocation solution based on blockchain, which enables digital digest and a resource allocation state of an invoice to be stored in the blockchain in advance. Data stored in a blockchain cannot be tampered with and the digital digest is unique (that is, one digital digest corresponds to one piece of original data); and therefore, whether a target invoice is true can be determined based on the digital digest stored in the blockchain. Specifically, a user only needs to upload the target invoice by using a client device, and if it can be detected that the resource allocation state corresponding to the digital digest of the target invoice is stored in the blockchain, it can be determined that the target invoice is true. When the resource allocation state is an unallocated state, resource allocation logic declared in a smart contract published in the blockchain can be invoked to allocate resources to the client.

FIG. 1 is a flowchart illustrating a method for resource allocation based on a blockchain according to some implementations of the present specification. The blockchain stores a corresponding relationship between a digital digest of an invoice and a resource allocation state corresponding to the invoice; and the digital digest can be calculated based on invoice content of the invoice or unique information in the invoice content. The method includes the following steps.

Step 110: Receive a target transaction submitted by a client to participate in resource allocation based on a target invoice.

Step 120: In response to the target transaction, calculate a digital digest of the target invoice, and query a resource allocation state stored in the blockchain and corresponding to the digital digest.

Step 130: If the detected resource allocation state is an unallocated state, invoke resource allocation logic declared in a smart contract published in the blockchain, to allocate resources to the client from a predetermined resource pool based on a predetermined allocation rule, and return a resource allocation result to the client.

The blockchain described in the present specification can specifically include a private blockchain, a shared blockchain, a consortium blockchain, and the like, which is not particularly limited in the present specification.

For example, in a scenario, the above blockchain can be a consortium blockchain composed of headquarters, branches, agencies, and the like as consortium members. An operator of the consortium blockchain can rely on the consortium blockchain to deploy corresponding services. The above headquarters, branches and agencies as consortium members can each serve as service nodes of the above service. Each service node can publish, in the form of a transaction in the consortium blockchain, the digital digest of the above invoice generated or received by the service node, and store the transaction in a distributed database in the consortium blockchain after the transaction undergoes consensus processing by consensus nodes in the consortium blockchain, so as to complete "upload to the blockchain" for deposit of the transaction information.

It should be noted that the transaction described in the present specification refers to a piece of data created by a client of the blockchain and needing to be finally published to the distributed database of the blockchain.

Transactions in the blockchain are usually divided into narrow transactions and broad transactions. The narrow transaction refers to a value transfer published by a user to the blockchain. For example, in a conventional bitcoin blockchain network, a transaction can be a transfer initiated by a user in the blockchain. The broad transaction refers to a piece of service data with a service intention published by a user to the blockchain. For example, the operator can build a consortium blockchain based on actual service requirements, and deploy, based on the consortium blockchain, some other online services unrelated to value transfer (such as a deposit service, authenticity verification service, resource allocation, and invoice lottery). In this consortium blockchain, the transaction can be a service message or service request with a service intention published by the user in the consortium blockchain.

The above client can include any type of upper-layer application that uses bottom-layer service data stored in the blockchain as data support to implement specific service functions.

In the blockchain technology, nodes in the blockchain usually need to rely on a corresponding smart contract to operate blocks. For example, operations such as storage, modification, and deletion in the blockchain need to rely on the smart contract. The smart contract can be a computer protocol that can be deployed in the blockchain to disseminate, verify, or perform a contract in an informatization manner. Corresponding operations can be implemented by declaring service logic in the smart contract. The smart contract allows trusted transactions to be conducted without a third party. These transactions are traceable and irreversible. The smart contract can ensure better security than a conventional contract method and reduce other transaction costs related to the contract. Generally, smart contracts can be deployed locally in blockchain nodes. When a node needs to perform a certain action, the node can invoke the corresponding smart contract and run the smart contract to execute service logic declared in the smart contract, so as to obtain an execution result.

The digital digest described in the present specification can refer to a hash value obtained after hash calculation based on original data.

The hash value is obtained through hash calculation based on invoice content of the invoice or unique information in the invoice content.

The invoice content can include unique information. For example, the invoice content can include invoice number and invoice code; the invoice number and the invoice code are usually unique information; and accordingly, the digital digest of the invoice can be recorded as hash (invoice number+invoice code). Certainly, the invoice content can further include non-unique information, such as invoice date and amount excluding tax; and accordingly, the digital digest of the invoice can be recorded as hash (invoice number+invoice code+invoice date+amount excluding tax).

Accordingly, the target transaction can include the invoice content of the target invoice or the unique information in the invoice content; and the calculating the digital digest of the target invoice includes: obtaining the invoice content of the target invoice in the target transaction or the unique information in the invoice content; and performing hash calculation based on the obtained invoice content of the target invoice or the obtained unique information in the invoice content to obtain the hash value.

As mentioned above, the invoice is uploaded to the blockchain in advance in the present specification. In some implementations, the method further includes: receiving an invoice creation request submitted by the client, the invoice creation request including invoice creation information input by a user; in response to the invoice creation request, invoking invoice creation logic declared in the smart contract published in the blockchain to create an invoice based on the invoice creation information; and, calculating a digital digest of the invoice, and storing a mapping relationship between the digital digest and a resource allocation state of the invoice in the blockchain, an initial resource allocation state of the invoice being an unallocated state.

It should be noted that the above calculation of the digital digest of the target invoice and the calculation of the digital digest of the invoice during creation of the invoice are performed by using the same hash algorithm.

The following is an example of uploading an invoice to a blockchain.

In the implementations, when a user needs to create an invoice in the blockchain, the user can initiate an invoice creation transaction by using a client, that is, initiate an invoice creation request by using the client. Specifically, the user can input invoice creation information (such as invoice title and amount) of a to-be-created target invoice by using an invoice creation page provided by the client. After the user inputs the invoice creation information, the client can generate a corresponding invoice creation request based on the invoice creation information input by the user, and send the invoice creation request to a node device in the blockchain.

After receiving the invoice creation request, the node device in the blockchain can respond to the invoice creation request, and invoke invoice creation logic declared in the smart contract published in the blockchain to create an invoice based on the invoice creation information in the invoice creation request; and after the invoice is created, the node device can further calculate a digital digest of the created invoice, and store a mapping relationship between the digital digest and an initial resource allocation state in the blockchain.

The initial resource allocation state of the created invoice can be an unallocated state.

In some implementations, the node device responding to the invoice creation request can further first determine whether an invoice creation quota of an invoice issuer corresponding to the invoice creation request is sufficient.

For example, a taxpayer identification number of an invoice issuer can be obtained from the invoice creation information input by the user in the invoice creation request, the corresponding invoice issuer can be determined based on the taxpayer identification number, and the invoice issuer is the invoice issuer corresponding to the invoice creation request. Subsequently, whether the invoice creation quota of the invoice issuer is sufficient can be first determined.

In an implementation, the node device can invoke quota check logic declared in the smart contract deployed in the blockchain to determine whether the invoice creation quota of the invoice issuer is sufficient.

The quota check logic can specifically be program code (such as some program methods or functions that can be invoked) declared in the smart contract and related to execution logic for checking the invoice creation quota of the invoice issuer.

Alternatively, the node device can invoke a trusted service of a third party and send the invoice creation request to the trusted service of the third party. The trusted service of the third party can be program code deployed on a trusted service device of the third party and related to execution logic for checking the invoice creation quota of the invoice issuer. For example, the trusted service device of the third party can be a device in an intranet of the tax bureau, which can improve data security.

The trusted service of the third party can determine whether the invoice creation quota of the invoice issuer is sufficient, and return a determined result to the node device. The node device can determine, based on the determined result returned by the trusted service of the third party, whether the invoice creation quota of the invoice issuer is sufficient.

Specifically, after it is determined that the invoice creation quota of the invoice issuer is sufficient, the trusted service of the third party can return a determined result that the invoice creation quota of the invoice issuer is sufficient to the node device. After receiving the determined result, the node device can determine that the invoice creation quota of the invoice issuer is sufficient. Or, the trusted service of the third party can return, after determining that the invoice creation quota of the invoice issuer is insufficient, the determined result that the invoice creation quota of the invoice issuer is insufficient to the node device. After receiving the determined result, the node device can determine that the invoice creation quota of the invoice issuer is insufficient.

If it is determined that the invoice creation quota of the invoice issuer is sufficient, the invoice creation logic declared in the smart contract deployed in the blockchain can be invoked to create an invoice based on the invoice creation information input by the user in the invoice creation request; and the corresponding relationship between the digital digest of the created invoice and the resource allocation state is stored.

The invoice creation logic can specifically be program code declared in the smart contract and related to execution logic for creating the invoice.

In another implementation, the invoice can be provided by an institution that originally generated the invoice. For example, invoice data can be directly or indirectly uploaded to the blockchain by a taxation authority. Specifically, after an invoice issuing device issues an invoice, the invoice is also recorded in a tax system of a tax bureau, and the tax system of the tax bureau can synchronously upload the invoice to the blockchain for deposit. The process of upload to the blockchain for deposit is the same as that of the previous implementation. Details are omitted herein for simplicity.

The following describes the resource allocation process of an invoice in the present specification.

After receiving the invoice, a user can use the invoice as a target invoice, and submit, by a client, a target transaction for participating in resource allocation based on the target invoice, to call a smart contract deployed in the blockchain and used for resource allocation, so as to allocate virtual resources to the client.

In some implementations, similar to the previous invoice creation, the user can input, to a client, invoice content of the target invoice or unique information in the invoice content (hereinafter, the invoice content or the unique information in the invoice content is simply referred to as invoice data), and the input invoice data is included in the target transaction sent by the client and is sent to a node device in the blockchain, to trigger the node device in the blockchain to invoke the deployed smart contract, so as to allocate virtual resources to the client. Therefore, the node device in the blockchain can directly receive the invoice data.

In another implementation, the user can take a picture of the issued target invoice, obtain an invoice image of the target invoice, and recognize the obtained invoice image on the client or on a third-party recognition system, to recognize the invoice data; and the invoice data obtained by image recognition is included in the target transaction sent by the client and sent to the node device in the blockchain, to trigger the node device in the blockchain to invoke the deployed smart contract, so as to allocate virtual resources to the client.

Image recognition of the obtained invoice image data can be performed specifically by a smart contract deployed in the blockchain, or performed by invoking a trusted service of a third party.

In some implementations, invoice data in the invoice image is recognized by using an image recognition algorithm. In the implementations, the smart contract includes contract logic for image recognition, which can recognize the invoice data in the invoice image at a node locally.

In some implementations, the method further includes the following operations.

The node device can also send, by invoking the trusted service of a third party (such as a third-party image recognition mechanism), an invoice image in a target transaction to the trusted service of the third party, the trusted service of the third party performs image recognition on the invoice image based on an included image recognition algorithm to obtain the above invoice data, and the node device can obtain the invoice data returned by the third-party image recognition mechanism. In the implementations, the image recognition can be completed by the third-party image recognition mechanism, thereby lowering the requirement for node performance (not all nodes can have computing resources required for image recognition).

In some implementations, after obtaining the invoice data in the target transaction, the node device can invoke state query logic declared in the smart contract published in the blockchain to calculate a digital digest of the target invoice, and query a resource allocation state stored in the blockchain and corresponding to the digital digest.

If the blockchain stores the resource allocation state corresponding to the digital digest and the resource allocation state is an unallocated state, resource allocation logic declared in a smart contract published in the blockchain is invoked, to allocate resources to the client from a predetermined resource pool based on a predetermined allocation rule, and a resource allocation result is returned to the client.

If the blockchain stores the resource allocation state corresponding to the digital digest but the resource allocation state is an allocated state, or if the resource allocation state corresponding to the digital digest cannot be detected, subsequent steps are not performed, and a resource allocation failure notification can be returned to the client.

Further, after target resources are allocated to the client from the predetermined resource pool, service execution state update logic declared in the smart contract published in the blockchain is further invoked, to change the resource allocation state of the target invoice from the unallocated state to an allocated state.

In some implementations, the resource pool can include a plurality of types of virtual resources; and accordingly, the blockchain can further store a corresponding relationship between each category of virtual resources in the resource pool and the number of resources.

In this case, after the target resources are allocated to the client from the predetermined resource pool based on the predetermined allocation rule, the smart contract can further update a number of resources stored in the blockchain and corresponding to the target resource.

The following description based on specific resource allocation scenarios.

In a scenario, the resource pool includes a prize pool; the virtual resources include virtual prizes; the resource allocation includes extracting virtual prizes for the client from the prize pool based on a certain lottery rule; and the resource allocation state includes a lottery state.

In this scenario, the user can construct a target transaction by using a client based on invoice content of the issued invoice or unique information in the invoice content, so as to invoke the smart contract deployed in the blockchain to draw a lottery.

Figure 2:
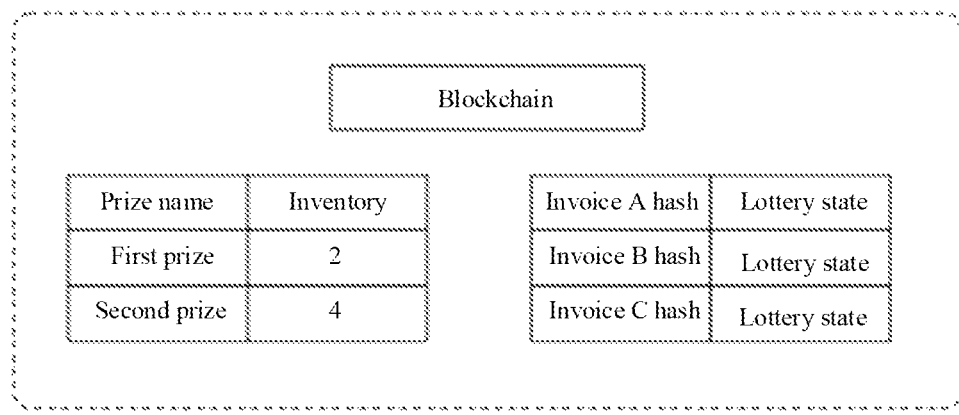
FIG. 2 is a schematic diagram illustrating an invoice lottery service according to some implementations of the present specification.
Figure 3:
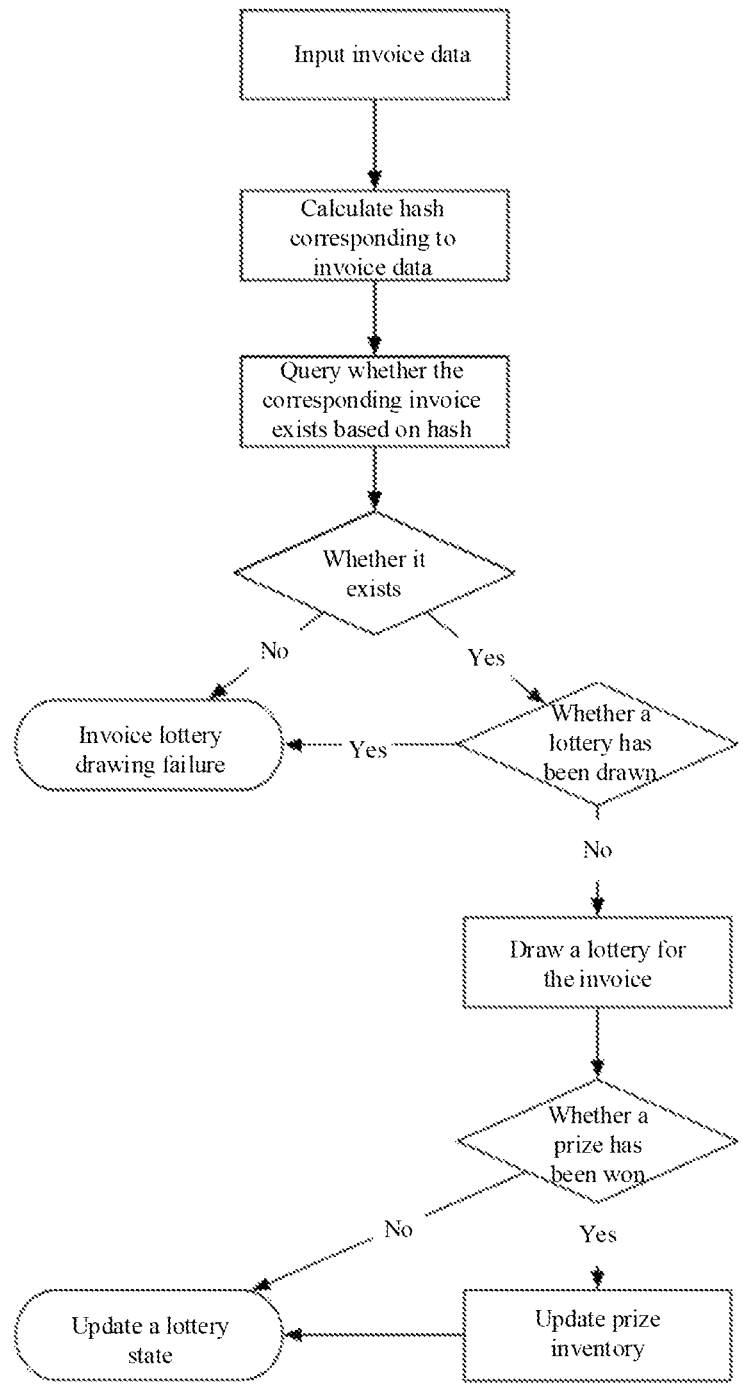
FIG. 3 is a schematic diagram illustrating an invoice lottery process according to some implementations of the present specification.

The following description based on the schematic diagram of an invoice lottery service shown in FIG. 2 and the schematic diagram of an invoice lottery process shown in FIG. 3. As shown in FIG. 2, after invoice A, invoice B, and invoice C are uploaded to the blockchain, a mapping relationship between invoice A hash and a lottery state, a mapping relationship between invoice B hash and a lottery state, and a mapping relationship between invoice C hash and a lottery state can be recorded in the blockchain.

As shown in FIG. 3, after receiving the invoice, the user can submit, to the blockchain by a client, a target transaction for drawing a lottery based on the invoice, to invoke a smart contract deployed in the blockchain for lottery, so as to draw a lottery for the invoice.

Accordingly, after obtaining the invoice data in the target transaction, the node device in the blockchain can invoke lottery state query logic declared in the smart contract to calculate the digital digest corresponding to the invoice data, and query invoice stored in the blockchain and corresponding to the digital digest, as well as the lottery state of the invoice.

If the invoice corresponding to the digital digest exists in the blockchain, and the lottery state of the invoice is that no lottery has been drawn, the node device can further invoke the lottery logic declared in the smart contract to draw a lottery for the invoice, and then return the lottery result to the client.

Further, the node device can invoke state update logic in the smart contract to update the lottery state corresponding to the digital digest to that the lottery has been drawn.

In addition to the lottery having been drawn, the updated lottery state can include whether a prize has been won, for example, the lottery has been drawn (no prize is won), and the lottery has been drawn (first prize).

If an invoice corresponding to the digital digest exists in the blockchain but the lottery state of the invoice is that the lottery has been drawn, it means that the to-be-identified invoice has been drawn although it has been deposited in the blockchain. Based on the principle that one invoice can only allow the lottery to be drawn once, repeated lottery drawing is avoided, and lottery logic is not allowed to be executed, so the result that the lottery has been drawn for the invoice can be returned to the client.

As shown in FIG. 2, the inventory of prizes is also recorded in the blockchain; and accordingly, a node also needs to operate prize winning inventory records for lottery results, specifically:

If the lottery result is that a prize has been won, the inventory of prizes with the winning name stored in the blockchain is reduced by 1 based on the winning name.

It should be noted that in the present specification, a function of modifying the inventory in the blockchain by an administrator is also provided.

The present specification provides a resource allocation solution based on a blockchain, which enables a digital digest and a resource allocation state of an invoice to be stored in the blockchain in advance. Data stored in the blockchain cannot be tampered with and the digital digest is unique (that is, one digital digest corresponds to one piece of original data); and therefore, whether a target invoice is true can be determined based on the digital digest stored in the blockchain. Specifically, a user only needs to upload the target invoice by using the client, and if it can be detected that the resource allocation state corresponding to the digital digest of the target invoice is stored in the blockchain, it can be determined that the target invoice is true. When the resource allocation state is an unallocated state, resource allocation logic declared in a smart contract published in the blockchain can be invoked to allocate resources to the client from a predetermined resource pool based on a predetermined allocation rule. In addition, because data can be globally synchronized in the blockchain, data related to lottery, such as lottery results and prize inventory, can be synchronized between all nodes in the blockchain, so that the data is open and transparent.

Figure 4:
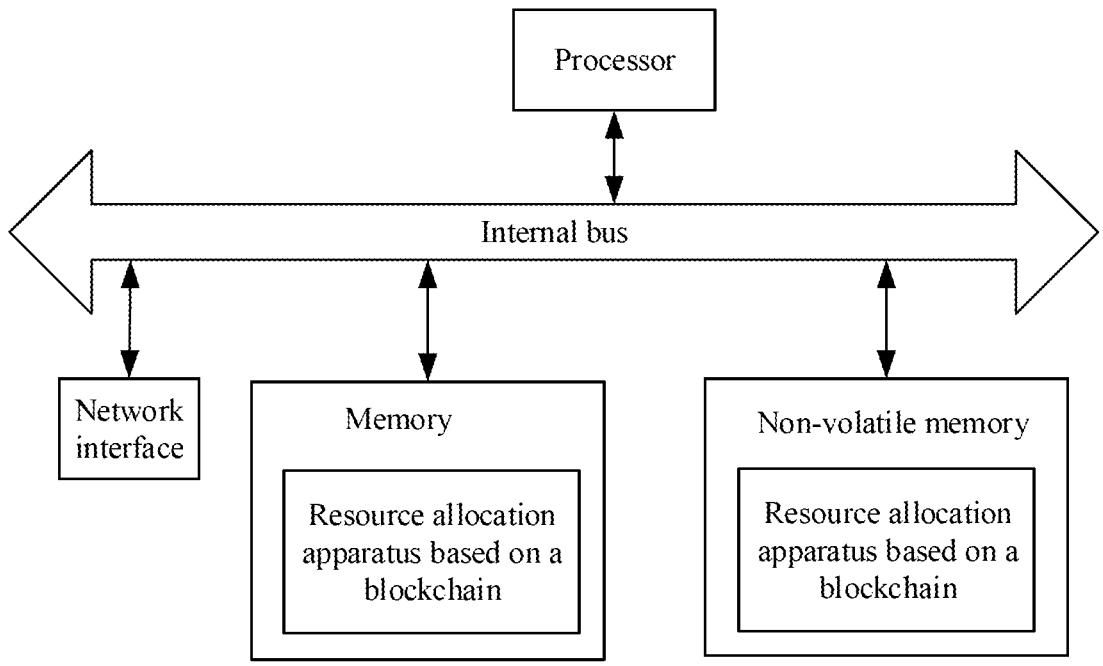
FIG. 4 is a diagram illustrating a hardware structure of an apparatus for resource allocation based on a blockchain according to some implementations of the present specification.

Corresponding to the above implementations of the method for resource allocation based on a blockchain, the present specification further provides implementations of the apparatus for resource allocation based on a blockchain. The apparatus implementations can be implemented by using software, hardware, or a combination thereof. Taking software implementation as an example, a logical apparatus is implemented by reading, using a processor of a device where the apparatus is located, corresponding computer service program instructions in a non-volatile memory into a memory for running. On the hardware level, FIG. 4 is a diagram illustrating a hardware structure of a device where an apparatus for resource allocation based on a blockchain is located according to the present specification. In addition to a processor, a network interface, a memory, and a non-volatile memory shown in FIG. 4, the device where the apparatus according to the implementations is located can generally further include other hardware depending on the actual resource allocation function based on a blockchain. Details are omitted for simplicity.

Figure 5:
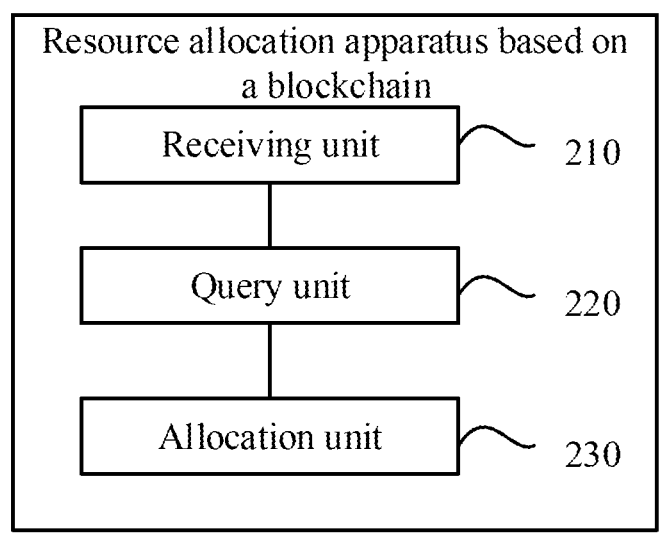
FIG. 5 is a schematic block diagram illustrating an apparatus for resource allocation based on a blockchain according to some implementations of the present specification.

FIG. 5 is a diagram illustrating modules in an apparatus for resource allocation based on a blockchain according to some implementations of the present specification. The apparatus corresponds to the implementation shown in FIG. 1, and the blockchain stores a corresponding relationship between a digital digest of an invoice and a resource allocation state corresponding to the invoice. The apparatus includes: a receiving unit 210, configured to receive a target transaction submitted by a client to participate in resource allocation based on a target invoice; a query unit 220, configured to: in response to the target transaction, calculate a digital digest of the target invoice, and query a resource allocation state stored in the blockchain and corresponding to the digital digest; and an allocation unit 230, configured to: if the detected resource allocation state is an unallocated state, invoke resource allocation logic declared in a smart contract published in the blockchain, to allocate resources to the client from a predetermined resource pool based on a predetermined allocation rule, and return a resource allocation result to the client.

Optionally, the apparatus further includes: an invoice creation request receiving unit, configured to receive an invoice creation request submitted by the client, the invoice creation request including invoice creation information input by a user; and an invoice creation response unit, configured to: in response to the invoice creation request, invoke invoice creation logic declared in the smart contract published in the blockchain to create an invoice based on the invoice creation information; calculate a digital digest of the invoice, and store a mapping relationship between the digital digest and a resource allocation state of the invoice in the blockchain, an initial resource allocation state of the invoice being an unallocated state.

Optionally, the query unit 220 is specifically configured to: in response to the target transaction, invoke state query logic declared in the smart contract published in the blockchain to calculate a digital digest of the target invoice, and query a resource allocation state stored in the blockchain and corresponding to the digital digest.

Optionally, the apparatus further includes: a state update subunit, configured to: after target resources are allocated to the client from the predetermined resource pool, further invoke resource allocation state update logic declared in the smart contract published in the blockchain, to change the resource allocation state of the target invoice from the unallocated state to an allocated state.

Optionally, the blockchain further stores a corresponding relationship between each category of resources in the resource pool and the number of resources; the apparatus further including: a number update subunit, configured to: after the target resources are allocated to the client from the predetermined resource pool based on the predetermined allocation rule, update a number of resources stored in the blockchain and corresponding to the target resource.

Optionally, the digital digest of the invoice includes: a hash value obtained through hash calculation based on invoice content of the invoice or unique information in the invoice content.

Optionally, the target transaction includes the invoice content of the target invoice or the unique information in the invoice content; and the calculating the digital digest of the target invoice includes: obtaining the invoice content of the target invoice in the target transaction or the unique information in the invoice content; and performing hash calculation based on the obtained invoice content of the target invoice or the obtained unique information in the invoice content to obtain the hash value.

Optionally, the blockchain is a consortium blockchain.

Optionally, the resource pool includes a prize pool; the resources include virtual prizes; the resource allocation includes extracting virtual prizes for the client from the prize pool; and the resource allocation state includes a lottery state.

The systems, apparatuses, modules or units illustrated in the above implementations can be implemented by computer chips or entities, or by products with certain functions. A typical implementation device is a computer. The computer can be a personal computer, a laptop computer, a cellular phone, a camera phone, a smartphone, a personal digital assistant, a media player, a navigation device, an email sending and receiving device, a game console, a tablet computer, a wearable device, or a combination thereof.

The implementation process of functions of each unit in the above apparatus is detailed in the implementation process of the corresponding steps in the above method. Details are omitted herein for simplicity.

Because the apparatus implementations basically correspond to the method implementations, for related parts, references can be made to a partial description of the method implementation. The apparatus implementations described above are merely illustrative, where units described as separate components can or cannot be physically separated. Components displayed as units can or cannot be physical units, that is, the components can be located in one place, or can be distributed to multiple network units. Some or all of the modules can be selected based on actual needs to achieve the object of the solution of the present specification. A person of ordinary skill in the art can understand and implement the implementations without making innovative efforts.

FIG. 5 shows internal functional modules and the schematic structure of an apparatus for resource allocation based on a blockchain, which can be substantially implemented by an electronic device. The electronic device includes: a processor; and a memory configured to store processor-executable instructions; where the processor is configured to perform the above methods for resource allocation based on a blockchain.

The method includes: receiving a target transaction submitted by a client to participate in resource allocation based on a target invoice; in response to the target transaction, calculating a digital digest of the target invoice, and querying a resource allocation state stored in the blockchain and corresponding to the digital digest, the blockchain storing a mapping relationship between the digital digest of an invoice and the resource allocation state corresponding to the invoice; and if the detected resource allocation state is an unallocated state, invoking resource allocation logic declared in a smart contract published in the blockchain, to allocate resources to the client from a predetermined resource pool based on a predetermined allocation rule, and returning a resource allocation result to the client.

Optionally, the method further includes: receiving an invoice creation request submitted by the client, the invoice creation request including invoice creation information input by a user; in response to the invoice creation request, invoking invoice creation logic declared in the smart contract published in the blockchain to create an invoice based on the invoice creation information; and, calculating a digital digest of the invoice, and storing a mapping relationship between the digital digest and a resource allocation state of the invoice in the blockchain, an initial resource allocation state of the invoice being an unallocated state.

Optionally, the calculating a digital digest of the target invoice, and querying a resource allocation state stored in the blockchain and corresponding to the digital digest includes: invoking state query logic declared in the smart contract published in the blockchain to calculate a digital digest of the target invoice, and querying a resource allocation state stored in the blockchain and corresponding to the digital digest.

Optionally, the method further includes: after target resources are allocated to the client from the predetermined resource pool, further invoking resource allocation state update logic declared in the smart contract published in the blockchain, to change the resource allocation state of the target invoice from the unallocated state to an allocated state.

Optionally, the blockchain further stores a corresponding relationship between each category of resources in the resource pool and the number of resources; the method further including: after the target resources are allocated to the client from the predetermined resource pool based on the predetermined allocation rule, updating a number of resources stored in the blockchain and corresponding to the target resource.

Optionally, the digital digest of the invoice includes: a hash value obtained through hash calculation based on invoice content of the invoice or unique information in the invoice content.

Optionally, the target transaction includes the invoice content of the target invoice or the unique information in the invoice content; and the calculating the digital digest of the target invoice includes: obtaining the invoice content of the target invoice in the target transaction or the unique information in the invoice content; and performing hash calculation based on the obtained invoice content of the target invoice or the obtained unique information in the invoice content to obtain the hash value.

Optionally, the blockchain is a maintained by a consortium blockchain network.

Optionally, the resource pool includes a prize pool; the resources include virtual prizes; the resource allocation includes extracting virtual prizes for the client from the prize pool; and the resource allocation state includes a lottery state.

In the above implementations of the electronic device, it should be understood that the processor can be a central processing unit (CPU), or can be another general-purpose processor, a digital signal processor (DSP), an application specific integrated circuit (ASIC), or the like. The general-purpose processor can be a microprocessor or any conventional processor, or the like, and the above memory can be a read-only memory (ROM), a random access memory (RAM), a flash memory, a hard disk or a solid-state disk. The steps of the method according to the implementations of the present specification can be directly performed by a hardware processor or performed by a combination of hardware and software modules in a processor.

Each implementation in the present specification is described in a progressive way. For the same or similar parts between the implementations, references can be made to each other. Each implementation focuses on differences from other implementations. Particularly, because the electronic device implementation is similar to the method implementations, the description is relatively simple. For related parts, references can be made to partial description of the method implementations.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 6:
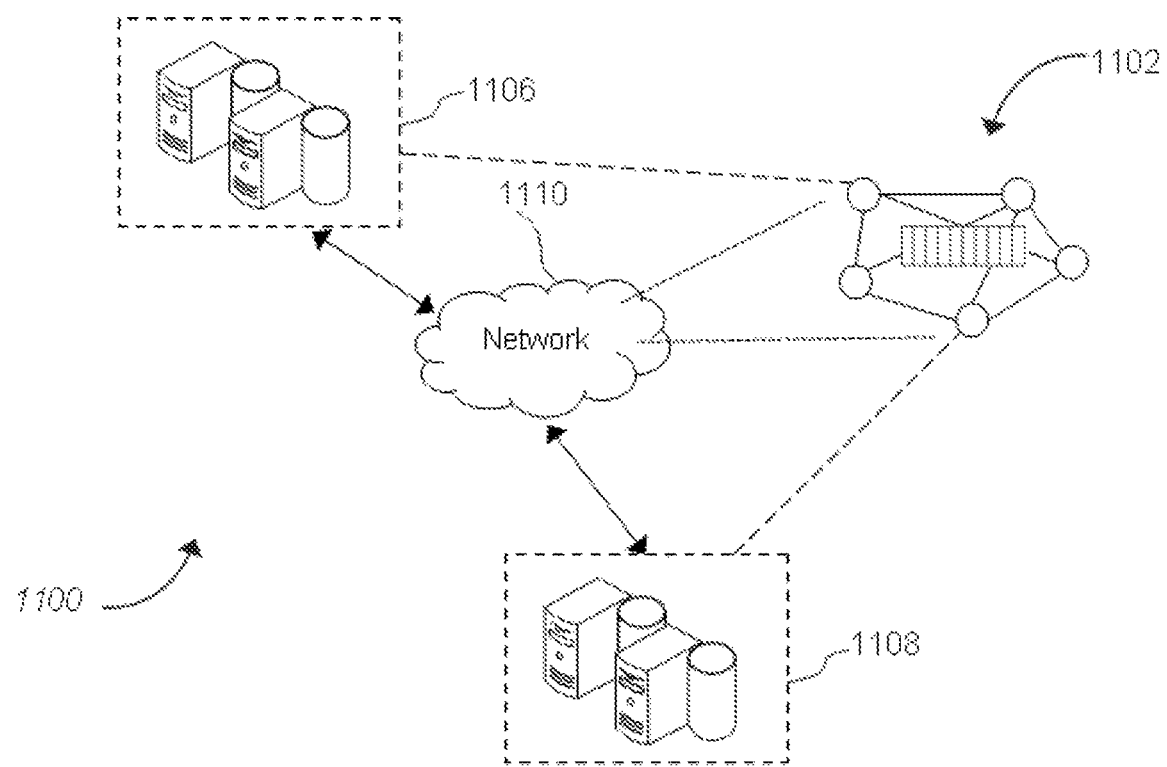
FIG. 6 is a diagram illustrating example environments that can be used to execute embodiments of this specification.

FIG. 6 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smart-phone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 6, the consortium blockchain network 1102 is represented as a peer-to-peer network of nodes, and the computing systems 1106, 1108 provide nodes of the first entity and second entity, respectively, which participate in the consortium blockchain network 1102.

Figure 7:
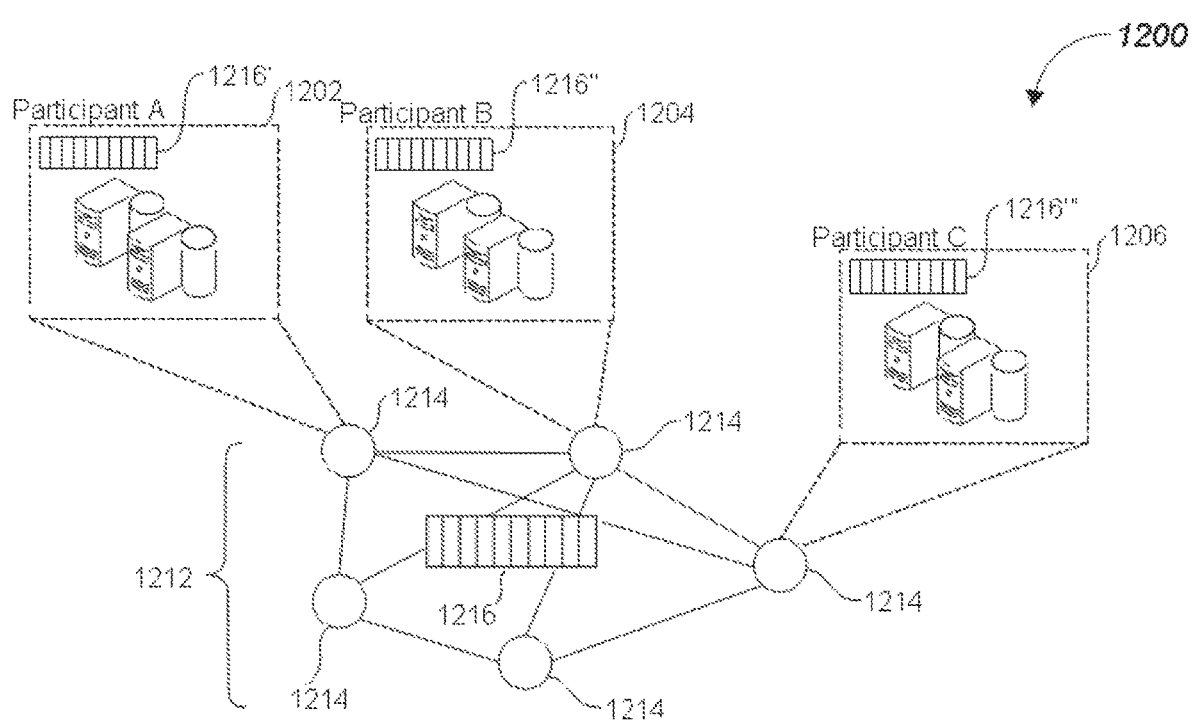
FIG. 7 is a diagram illustrating an example architecture in accordance with embodiments of this specification.

FIG. 7 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 7, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 7, the participant systems 1202, 1204 store respective, complete copies 1216', 1216", 1216'" of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 7, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 7, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 7, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 1100 of FIG. 6 and using the blockchain architecture 1200 of FIG. 7. For example, transaction information of a logistic process is stored as blocks in the blockchain 1216.

A person skilled in the art can easily figure out other implementations of the present specification after thinking over the present specification and practicing the present disclosure herein. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The above descriptions are merely preferred implementations of the present specification, but are not intended to limit the present specification. Any modification, equivalent replacement, or improvement made without departing from the spirit and principle of the present specification shall fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for lottery prize allocation based on a blockchain, the method comprising:
  calculating, by a first node of a blockchain network that maintains the blockchain, a digital digest of an invoice based, at least in part, on a hash value generated using at least a unique identifier of the invoice;
  storing, by the first node of the blockchain, a mapping relationship between at least the digital digest and a lottery prize allocation state of the invoice, in the blockchain;
  receiving, by a second node of the blockchain, a target transaction submitted by a client device to participate in a lottery based, at least in part, on a target invoice;
  in response to the target transaction:
    extracting at least a unique identifier of the target invoice from an image of the target invoice;
    calculating a digital digest of the target invoice based, at least in part, on a hash value generated using at least the unique identifier of the target invoice; and
    determining a target lottery prize allocation state stored in the blockchain based, at least in part, on querying the mapping relationship using the digital digest of the target invoice; and
  in response to determining that the target lottery prize allocation state is an unallocated state, invoking, by the second node, lottery prize allocation logic provided in a smart contract deployed in the blockchain, to allocate lottery resources to the client device from a lottery resource pool based, at least in part, on an allocation rule, and returning a lottery prize allocation result to the client device.

2. The method according to claim 1, further comprising:
  receiving an invoice creation request submitted by another client device, the invoice creation request including the unique identifier of the invoice;
  in response to the invoice creation request, invoking invoice creation logic provided in the smart contract deployed in the blockchain to create the invoice; and
  wherein storing the mapping relationship includes setting an initial lottery prize allocation state of the invoice to the unallocated state.

3. The method according to claim 1, wherein the first node and the second node are a same node of the blockchain network.

4. The method according to claim 1, further comprising:
  responsive to returning the lottery prize allocation result to the client device, invoking, by the second node, allocation state update logic provided in the smart contract deployed in the blockchain to change the lottery prize allocation state of the target invoice from the unallocated state to an allocated state.

5. The method according to claim 1, wherein the unique identifier of the invoice includes at least one of an invoice number or invoice code.

6. The method according to claim 1, wherein the hash value generated using at least the unique identifier of the invoice and the hash value generated using at least the unique identifier of the target invoice are generated based, at least in part, on a same method of hash calculation.

7. The method according to claim 1, wherein the target transaction includes other content of the target invoice that is different than the unique identifier of the target invoice and the digital digest of the target invoice is calculated based further on the other content.

8. The method according to claim 1, wherein the blockchain network includes a consortium blockchain network.

9. A non-transitory storage medium storing contents that, when executed by one or more processors, cause the one or more processors to perform actions comprising:
  receiving, by a node of a blockchain network that maintains a blockchain, a target transaction submitted by a client to participate in lottery resource allocation based, at least in part, on a target invoice;

in response to receiving the target transaction:
  obtaining at least a unique identifier of the target invoice from an image of the target invoice;
  calculating a target digital digest of the target invoice based, at least in part, on a hash value generated using at least the unique identifier of the target invoice; and
  determining a target lottery resource allocation state stored in the blockchain based, at least in part, on querying a mapping relationship stored in the blockchain using the target digital digest, wherein the mapping relationship is a mapping relationship between at least one digital digest and at least one lottery resource allocation state; and
  responsive to determining that the target lottery resource allocation state is an unallocated state, invoking, by the node of the blockchain, lottery resource allocation logic provided in a smart contract deployed in the blockchain, to allocate at least one of a plurality of lottery resources to the client from a lottery resource pool based, at least in part, on an allocation rule, and returning a lottery resource allocation result to the client.

10. The storage medium according to claim 9, wherein the actions further comprise:
  receiving an invoice creation request submitted by another client device;
  in response to the invoice creation request, invoking invoice creation logic provided in the smart contract deployed in the blockchain to create a source invoice based, at least in part, on the invoice creation information; and
  calculating a source digital digest of the source invoice based, at least in part, on a hash value generated using at least a unique identifier of the source invoice, wherein the mapping relationship is between at least the source digital digest and at least a lottery resource allocation state of the source invoice.

11. The storage medium according to claim 9, wherein the actions further comprise:
  responsive to returning the lottery resource allocation result to the client device, invoking allocation state update logic provided in the smart contract deployed in the blockchain to change the lottery resource allocation state of the target invoice from the unallocated state to an allocated state.

12. The storage medium according to claim 9, wherein the unique identifier of the target invoice includes at least one of an invoice number or invoice code.

13. The storage medium according to claim 9, wherein the target transaction includes other content of the target invoice that is different than the unique identifier of the target invoice and the digital digest of the target invoice is calculated based further on the other content.

14. The storage medium according to claim 9, wherein the blockchain network includes a consortium blockchain network.

15. A system, comprising:
  one or more processors; and
  memory storing contents that, when executed by the one or more processors, cause the system to perform actions comprising:
    receiving, by a node of a blockchain network that maintains a blockchain, a target transaction submitted by a client to participate in lottery resource allocation based, at least in part, on a target invoice;
    in response to receiving the target transaction:
      obtaining at least a unique identifier of the target invoice from an image of the target invoice;
      calculating a target digital digest of the target invoice based, at least in part, on a hash value generated using at least the unique identifier of the target invoice; and
      determining a target lottery resource allocation state stored in the blockchain based, at least in part, on querying a mapping relationship stored in the blockchain using the target digital digest, wherein the mapping relationship is a mapping relationship between at least one digital digest and at least one lottery resource allocation state; and
    responsive to determining that the target lottery resource allocation state is an unallocated state, invoking, by the node of the blockchain, lottery resource allocation logic provided in a smart contract deployed in the blockchain, to allocate at least one lottery resource to the client from a lottery resource pool based, at least in part, on an allocation rule, and returning a lottery resource allocation result to the client.

16. The system according to claim 15, wherein the actions further comprise:
  receiving an invoice creation request submitted by another client device;
  in response to the invoice creation request, invoking invoice creation logic provided in the smart contract deployed in the blockchain to create a source invoice based, at least in part, on the invoice creation information; and
  calculating a source digital digest of the source invoice based, at least in part, on a hash value generated using at least a unique identifier of the source invoice, wherein the mapping relationship is between at least the source digital digest and at least a lottery resource allocation state of the source invoice.

17. The system according to claim 15, wherein the actions further comprise:
  responsive to returning the lottery resource allocation result to the client device, invoking allocation state update logic provided in the smart contract deployed in the blockchain to change the lottery resource allocation state of the target invoice from the unallocated state to an allocated state.

18. The system according to claim 15, wherein the unique identifier of the target invoice includes at least one of an invoice number or invoice code.

19. The system according to claim 15, wherein the target transaction includes other content of the target invoice that is different than the unique identifier of the target invoice and the digital digest of the target invoice is calculated based further on the other content.

20. The system according to claim 15, wherein the blockchain network includes a consortium blockchain network.

* * * * *